Oct. 14, 1930.  F. A. BULLINGTON  1,778,182
ANNULAR CYLINDER COMBUSTION ENGINE
Original Filed Jan. 3, 1927
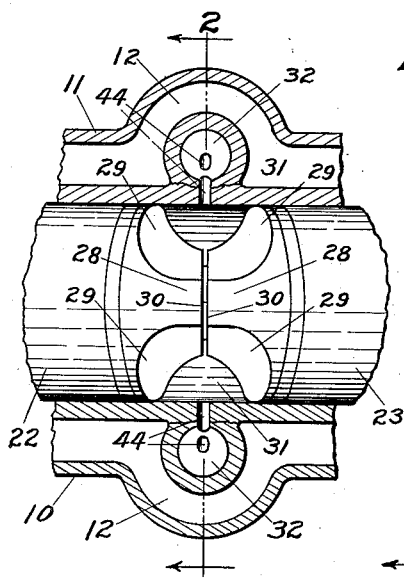
Fig.3.
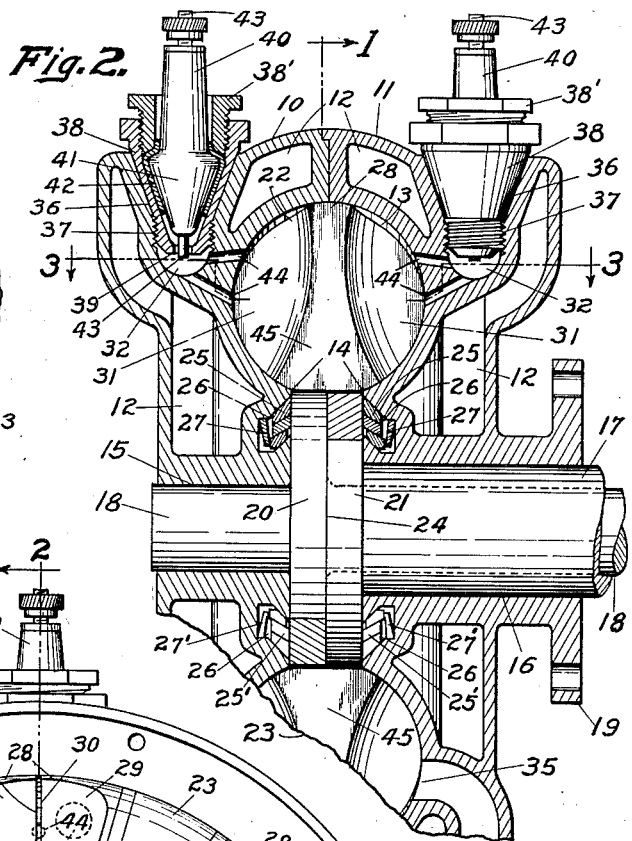
Fig.2.
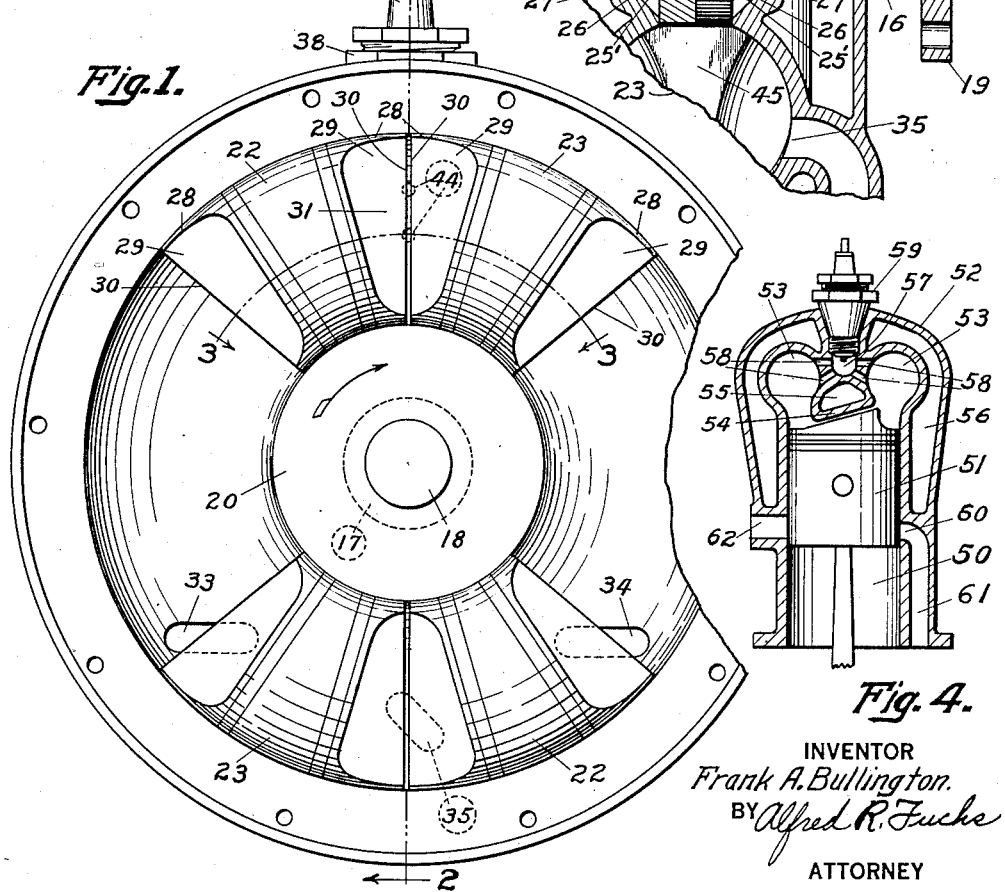
Fig.1.
Fig.4.
INVENTOR
Frank A. Bullington.
BY Alfred R. Fuchs
ATTORNEY Patented Oct. 14, 1930

1,778,182

UNITED STATES PATENT OFFICE

FRANK A. BULLINGTON, OF KANSAS CITY, MISSOURI

ANNULAR-CYLINDER COMBUSTION ENGINE

Application filed January 3, 1927, Serial No. 158,617. Renewed January 17, 1930.

My invention relates to ignition means for internal combustion engines and more particularly to means for providing rapid combustion of the fuel charges in the combustion chambers of such engines.

My improved means for obtaining rapidity of combustion in an internal combustion engine is shown as being applied to an internal combustion engine of a particular type, but may be utilized in an internal combustion engine of any other type with similar advantage. By providing means for obtaining an increased rapidity of combustion in an internal combustion engine over what has been previously obtainable, a more efficient operation of such an engine is obtained, particularly when operated at high rotative speeds. This is due to the fact that in the operation of the ordinary types of engines, a time factor is involved in the combustion of the fuel mixture, because of the time consumed in the propagation or travel of combustion through the fuel charge from the point of initial ignition. This time factor of combustion makes it necessary to time the initial ignition considerably in advance of the actual beginning of the expansion stroke of the engine piston in order to have efficient expansion of the gases after the complete combustion of the fuel. By increasing the rapidity of combustion, the required advance time of initial ignition is greatly reduced, thereby greatly reducing the negative back pressure ordinarily present during the latter part of the combustion stroke of the piston due to such advance of the time of initial ignition, and thereby increasing the efficiency of the engine.

It is a purpose of my invention to provide means for obtaining rapidity of combustion in an internal combustion engine by dividing the charge in the working chamber of the engine into fractional components during the latter part of the compression stroke, and to also preferably impart turbulence to said charge by said means. This may be accomplished in numerous ways, being shown in the drawings as being accomplished both by providing a particular form of piston for accomplishing this purpose and by providing a particular cylinder construction. Obviously the means for dividing the charge may be applied to any type of engine, whether with single or opposed pairs of pistons, or whether of the ordinary reciprocating type or with an annular cylinder having pistons rotating about a common axis. By dividing the charge, combustion does not have to be propagated through such a great distance, thus increasing the rate of combustion.

It is a further purpose of my invention to provide means for obtaining rapidity of combustion in an internal combustion engine by igniting the charge in the working chamber at a plurality of points, and preferably by multiple ignition in the cylinder of each fractional charge obtained by the charge dividing means referred to above. This may be accomplished by igniting each fractional component of the charge independently of the other or by igniting the components from the same ignition means.

The ignition means preferably comprises spark plugs having terminals mounted in relatively small initial ignition chambers spaced from the working chambers and having passages establishing communication between the chambers. A plurality of passages preferably extends into each of the divisions of the working chambers obtained by operation of the charge dividing means, and these passages comprise injection nozzles for propagating combustion from the initial ignition chambers to a plurality of spaced points in the working chambers, thereby causing rapid combustion of the charge from a plurality of points of ignition.

It is particularly a purpose of my invention, to provide for rapid combustion in the fuel charge of an internal combustion engine by a combination of all the means set forth above, whereby the maximum rate of combustion is obtainable. My invention also includes a new and improved spark plug construction, whereby overheating of the spark plug is avoided, thus preventing pre-ignition.

Other objects and advantages of my invention will appear as the description of the drawings proceeds. I desire to have it understood, however, that I do not intend to limit myself to the particular details of structure shown or described, but that I intend to include as part of my invention, all such obvious changes and modifications as would occur to a person skilled in this art, and as would fall within the scope of the claims.

In the drawings:

Fig. 1 is a side elevation of one half of the engine cylinder, partly broken away, as viewed from the inside thereof, and showing the pistons and associated parts;

Fig. 2 is a fragmentary sectional view taken substantially on the line 2—2 of Figs. 1 and 3;

Fig. 3 is a fragmentary section taken on the line 3—3 of Figs. 1 and 2 and

Fig. 4 is a fragmentary sectional view of a modification.

Referring in detail to the drawings, my improved engine shown in Figs. 1 to 3 inclusive comprises a casing made up of a pair of members 10 and 11 having hollow walls providing cooling medium circulating spaces 12 within the same. The members 10 and 11 are so formed that when the same are assembled as shown in Fig. 2, an annular chamber 13, substantially circular in cross section and an annular slot or passage 14 connecting therewith are formed within the engine casing. The casing member 10 is provided with a bearing portion 15 and the casing member 11 with a bearing portion 16, the hollow shaft 17 being journalled in the bearing 16 and the shaft 18 in the bearing 15, the shaft 18 being rotatable within the shaft 17. The casing formed by the members 10 and 11 is mounted upon any suitable support by means of the bolt flange 19.

Extending outwardly from the shaft member 18 is a disklike rotor portion 20 and extending outwardly from the shaft member 17 is a similar rotor portion 21, said portions 20 and 21 extending through the slot 14 and carrying respectively the pistons 22 and 23. The pistons 22 and 23 extend outwardly from the rotor portions 20 and 21 and are rotatable about the axis of said rotor in the slot 14. The pistons 22 carried by the rotor portion 20 and the pistons 23 carried by the rotor portion 21 are, respectively, arranged diametrically opposite each other in the form of the invention shown in Figs. 1 to 3, and the pistons 22 and 23 alternate with each other around the axis of rotation thereof. Suitable mechanism is provided whereby the pistons have such variable relative speeds of rotation that the successive pistons in the annular cylinder chamber 13 have relative movements opposed to each other, to thus provide working chambers between the pistons of continuously varying capacity, alternately increasing and decreasing, as is desired in an engine of the character shown. Such a mechanism is shown and described in my Patent No. 1,579,207, patented April 6, 1926.

The rotor portions 20 and 21 are provided with engaging flat faces 24 and suitable means is provided for obtaining a sealed joint between the walls of the slot 14, and the rotor portions 20 and 21 and between said rotor portions themselves. Said sealing means comprise sealing rings 25 mounted in recesses 26 in the walls of said slot 14 and bearing against the rotor portions. The sealing rings are preferably of a conical form having split joints 25' and 27' and are put under tension when placed in position so as to have an inherent tendency to expand. The recesses 26 are so shaped that the walls thereof coöperate with the rings 25 and the resilient members 27 in such a manner that the sealing rings will readily follow the members 20 and 21 in their movements away from the adjoining wall portions of the slot 14, but will resist actively the movement of the members 20 and 21 toward said wall portions.

Each of the pistons 22 and 23 is provided with curved wall portions conforming substantially to the curved wall of the passage 13 and the outer faces of the rotor portions 20 and 21 adjacent thereto. The end walls of the pistons 22 and 23 are formed similar to each other and the same numerals are accordingly applied to corresponding parts of both sets of pistons. Each end of each of said pistons is provided with a central protuberance 28 and cut-away portions or depressions 29 on opposite sides of the protuberance 28. The end faces 30 of the central projections or protuberances 28 are substantially flat, and when the pistons approach each other said end faces approach each other very closely, leaving only sufficient mechanical clearance to prevent actual engagement of the same with each other. The walls of the depressions 29 are concavely curved, thus providing curved walled combustion chambers 31 in the cylinder chamber 13, on opposite sides thereof, when the pistons approach each other, as shown in Figs. 1 and 2. The pistons thus act to divide the fuel charge located in the working chamber between each pair thereof as the same reach the latter portion of their compression strokes and also set up turbulence in said charge due to the movement of the fuel mixture from between the end faces 30 into the recesses 31 formed by the depressions 29. The charge is furthermore displaced by the action of the pistons, transversely of the chamber 13, in opposite directions, toward the initial ignition chambers 32.

The annular cylinder formed by the members 10 and 11 is provided with an inlet port 33, a primary exhaust port 34 and a secondary exhaust port 35, spaced at proper points about the passage 13. The pistons have relative movements such that each opposed pair thereof is a maximum distance apart twice during each revolution of said pistons and also a minimum distance apart twice during each revolution. Said cylinder is also provided with ignition means comprising spark plugs associated with the initial ignition chambers 32 and means for propagating combustion from said initial ignition chambers to a plurality of points in each of the combustion chambers 31.

The initial ignition chambers 32 are preferably relatively small, and are substantially hemispherical in shape. Said chambers 32 are located preferably at the bottoms of the spark plug sockets 36 of conical form provided in the cylinder walls, said sockets having threaded portions 37 at the small ends thereof adapted to receive the external threads on the small ends of the conical spark plug shells 38. The outer conical surface of each shell member 38 is substantially smooth and uninterrupted and fits the conical inner surface of the socket 36, to provide a large contact area between the socket wall and the shell. The small end of the shell member 38 is substantially closed except for a central opening 39 comprising an ignition port.

Held in position within the shell member 38 of each spark plug by the retaining member 38' is an electrical insulating member 40 having an enlarged conical end portion 41 having a smoothly tapered outer surface, said conical portion being of considerable length and being surrounded throughout the major portion of its length by a gasket sealing member 42. Said sealing member 42 provides a relatively large bearing surface in contact with the shell portion 38, so as to provide for the ready transfer of heat from the electrical insulator 40 and thus from the electrically insulated electrode 43 carried thereby. The electrode 43 is preferably of relatively large cross section and of relative short exposed terminal length. The purpose of the short length of the exposed portion of the terminal is to reduce the heating effect of the ignited fuel thereon to a minimum, and the large diameter thereof is provided for the purpose of rapidly conducting the heat from the exposed terminal portion thereof away through the member 40, the sealing member 42 and the shell portion 38. The threaded end portion of the shell member 38 is provided with walls of such cross section as to rapidly conduct the heat away from the ignition port walls and the spark plug receiving socket is substantially surrounded by the water space 12. Thus the ignition means is kept at a relatively low temperature, this being very important, especially in high speed engines, to avoid pre-ignition.

Each of the initial ignition chambers is provided with a plurality of passages 44 radiating from said chambers and establishing communication between said initial ignition chambers and the combustion chambers 31 for admitting fuel to the ignition chamber. Said passages open into the cylinder chamber 13 preferably in radial alignment with the axis of the cylinder. Said passages comprise injection nozzles for the injection of burning fuel from the initial ignition chamber into the combustion chamber associated therewith, combustion being very rapid in the ignition chamber due to its smallness, the pressure of the fuel mixture being increased during combustion, expelling the burning gas through the passages into the combustion chamber formed between the pistons, said burning gas penetrating the fuel charge in the combustion chamber in different localities and thereby causing rapid combustion.

It will be noted, that the portion of the end wall 30 is enlarged toward the axial center of the engine as indicated at 45, the walls gradually curving as shown in Fig. 2, with the center of curvature thereof located substantially at the spark plug terminals within the initial combustion chambers 32, and said depressions 29 decrease in depth and width toward said axial center. This provides the shortest path for the flame to all portions of the fuel charge and aids in providing rapid combustion.

In Fig. 4 a fragmentary view of a two stroke type of reciprocating engine is shown having a cylinder 50 within which the piston 51 operates, said piston moving toward and away from the head or end wall 52 of said cylinder. Said end wall is provided with recesses 53 on opposite sides of a central projection 54 which may be cooled by means of a water space 55 communicating with the water space 56 in the hollow wall of the cylinder. The piston 51 cooperates with the wall portion 54 of the cylinder head to divide the fuel charge within the cylinder into components which enter the recesses 53 and these are ignited at a plurality of points from the ignition chamber 57 by means of the burning gas injection passages 58, initial ignition being obtained by means of the spark plug 59 corresponding in construction and mounting to the spark plug described in connection with Figs. 1 to 3 inclusive. A fuel inlet port 60 and passage 61 is provided and an exhaust port 62 is also provided. The construction of the ignition means and arrangement thereof is substantially the same in the form shown in Fig. 4 as in Figs. 1 to 3 except that instead of obtaining independent ignition of each fractional component of the fuel charge, the components thereof are ignited by means of the same spark plug.

Having thus described my invention what I desire to claim and secure by United States Letters Patent is:

1. In an internal combustion engine, a cylinder, a piston operating therein, said piston operating to divide the fuel charge in said cylinder during the latter part of the compression stroke thereof, and means for igniting each said division of said charge in the cylinder at a plurality of points.

2. In an internal combustion engine, a cylinder, a piston operating therein, said piston operating to divide the fuel charge in said cylinder during the latter part of the compression stroke thereof and imparting turbulence thereto, and means for igniting each said division of said charge in said cylinder at a plurality of points.

3. In an internal combustion engine, a cylinder and a piston operating therein, said piston having means for dividing the fuel charge in said cylinder into fractional components thereof during the latter part of the compression stroke of said piston.

4. In an internal combustion engine, a cylinder, a piston operating therein, said piston having means for dividing the fuel charge in said cylinder into fractional components thereof during the latter part of the compression stroke of said piston, and means for independently igniting each fractional component of said charge.

5. In an internal combustion engine, a cylinder, a piston operating therein, said piston having means for dividing the fuel charge in said cylinder into fractional components thereof during the latter part of the compression stroke of said piston, and means for igniting each said fractional component of said charge in said cylinder at a plurality of points.

6. In an internal combustion engine, a cylinder, a piston operating therein, said piston operating to divide the fuel charge in said cylinder during the latter part of the compression stroke thereof, means for independently igniting each division of said charge and means for applying the ignition to each said division at a plurality of points.

7. In an engine, an annular cylinder and pistons operating therein to compress fluid in said cylinder, said pistons being formed so as to set up turbulence in said fluid during the latter part of the compression stroke of said pistons and to divide the same into fractional components.

8. In an engine, an annular cylinder and pistons operating therein to compress fluid in said cylinder, said pistons being formed so as to set up terminal compression turbulence in said fluid and to divide the same into fractional components.

9. In an engine, an annular cylinder and pistons operating in opposed pairs therein to compress fluid therebetween, the opposed faces of said pistons being formed so as to set up turbulence in said fluid during the latter portion of the compression strokes thereof and to divide the same into fractional components.

10. In an engine, an annular cylinder and pairs of pistons operating therein, said pistons rotating about a common axis and having opposed faces each provided with spaced concave depressions therein.

11. In an engine, a cylinder having an endless passage therein and pistons operating therein, said pistons having opposed faces provided with spaced depressions, said faces being adapted to approach each other closely to displace the fluid charge between said pistons into said depressions and thereby divide the same into a plurality of fractional components.

12. In an engine, a cylinder having an endless passage therein, pistons operating therein, said pistons having opposed faces provided with spaced curved walled depressions, said faces being adapted to approach each other closely to displace the fluid charge between said pistons into said depressions and thereby divide the same into a plurality of fractional components and set up terminal compression turbulence in each of said components, and means for igniting each of said components, said depressions being located so that said charge is displaced toward said ignition means as said piston faces approach each other.

13. In an engine, a cylinder having an annular chamber adapted to receive a fuel charge therein, an initial ignition chamber spaced from said annular cylinder chamber, an ignition member therein and means for igniting said charge in said cylinder chamber at a plurality of points from said ignition member.

14. In an engine, a cylinder having a chamber adapted to receive a fuel charge therein, a piston operating in said cylinder chamber to compress said charge and divide the chamber near the end of its compression stroke into a plurality of divisions, each receiving a fractional component of the charge, an initial ignition chamber spaced from each division of said cylinder chamber, and in communication therewith, and an ignition member in each ignition chamber for igniting each component of said charge from said ignition chamber at a plurality of points.

15. In an engine, an annular cylinder having a chamber adapted to receive a fuel charge therein, a relatively small initial ignition chamber spaced from said cylinder chamber, an ignition member therein and means for igniting the charge in said cylinder chamber at spaced points by means of said ignition member.

16. In an engine, an annular cylinder having a chamber adapted to receive a fuel charge therein, an initial ignition chamber spaced from said cylider chamber, an ignition member therein and means for igniting said charge at a plurality of points from said ignition chamber, comprising flame propagation passages radiating from said ignition chamber and entering said cylinder chamber at substantially radially aligned points.

17. In an engine, a cylinder having an annular passage therein, pistons operating therein to divide said passage into a plurality of working chambers each adapted to receive a fuel charge therein, and means for igniting the fuel charges in said working chambers comprising an initial ignition chamber spaced from said passage, a spark plug having its terminals within said chamber and means for propagating combustion from said ignition chamber to a plurality of points in said working chamber.

18. In an engine, a cylinder having an annular passage therein, pistons operating therein to divide said passage into a plurality of working chambers each adapted to receive a fuel charge therein, and means for igniting the fuel charges in said working chambers comprising an initial ignition chamber spaced from said passage, a spark plug having its terminals within said chamber and means for propagating combustion from said ignition chamber to a plurality of points in said working chamber, comprising passages radiating from said ignition chamber and opening into said annular passage substantially in radial alignment with its axis.

19. In an engine, a cylinder having an annular passage therein, pistons operating therein to divide said passage into a plurality of working chambers each adapted to receive a fuel charge therein, and means for igniting the fuel charges in said working chambers comprising an initial ignition chamber spaced from said passage, a spark plug having its terminals within said chamber and injection passages for burning fuel leading from each of said ignition chambers to a plurality of points in said working chamber.

In testimony whereof, I hereunto subscribe my name this 28th day of December, 1926.

FRANK A. BULLINGTON.

CERTIFICATE OF CORRECTION.

Patent No. 1,778,182.  Granted October 14, 1930, to

FRANK A. BULLINGTON.

It is hereby certified that the above numbered patent was erroneously issued to the inventor, said "Bullington", whereas said patent should have been issued to "Bullington Motors, Kansas City, Missouri, a common law trust consisting of Solomon Stoddard, Ernest E. Howard and Frank A. Bullington, as assignee of the entire interest in said invention, as shown by the records of assignments in this office; page 4, line 129, claim 16, for the misspelled word "cylider" read cylinder; and that the said Letters Patent should be read with these corrections therein that the same may conform to the record of the case in the Patent Office.

Signed and sealed this 9th day of December, A. D. 1930.

(Seal)

M. J. Moore,
Acting Commissioner of Patents.